March 18, 1952  A. B. EDWARDS, JR  2,589,685
WINDOW
Filed April 2, 1946  2 SHEETS—SHEET 1
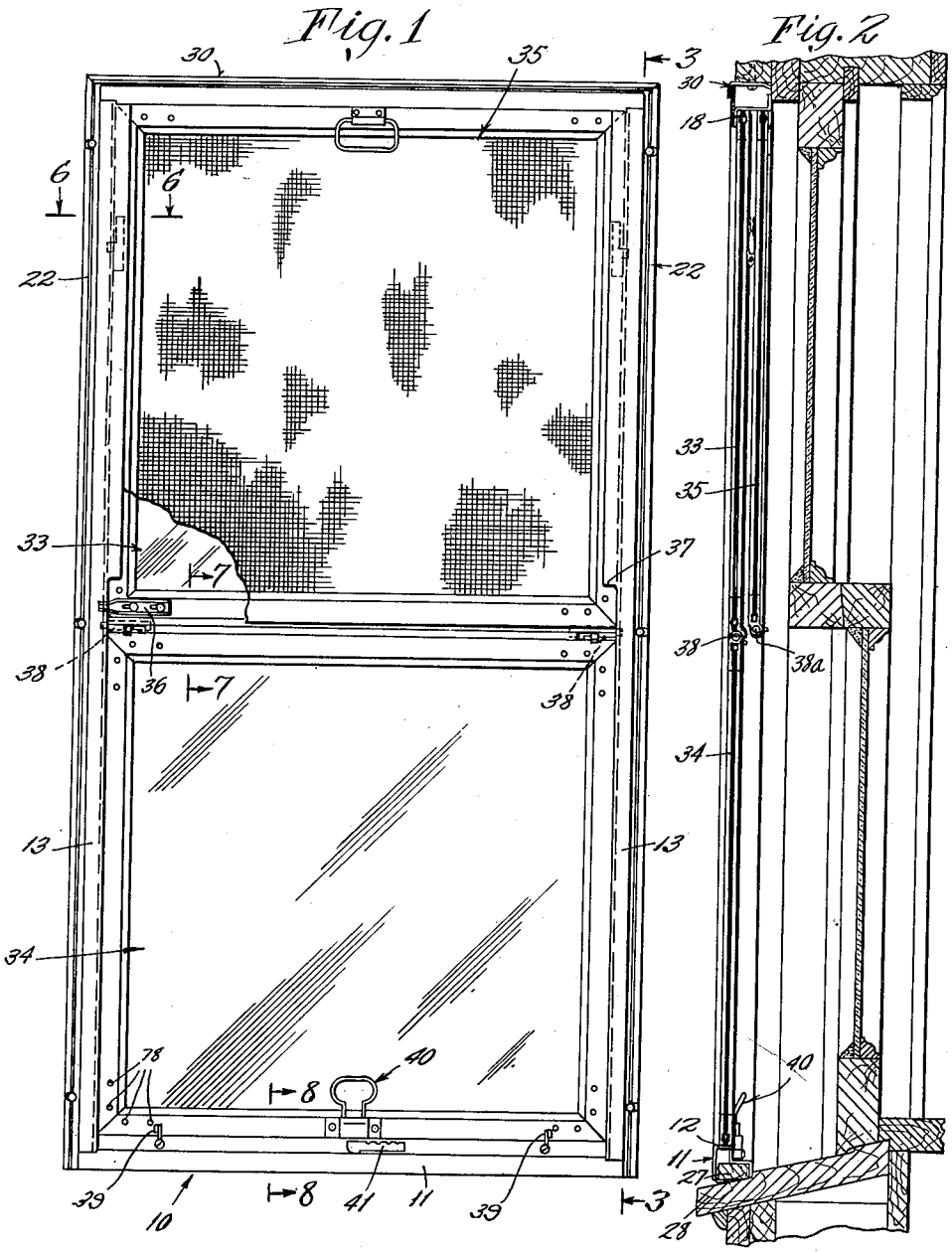
INVENTOR
Alfred B. Edwards Jr.
BY
ATTORNEYS

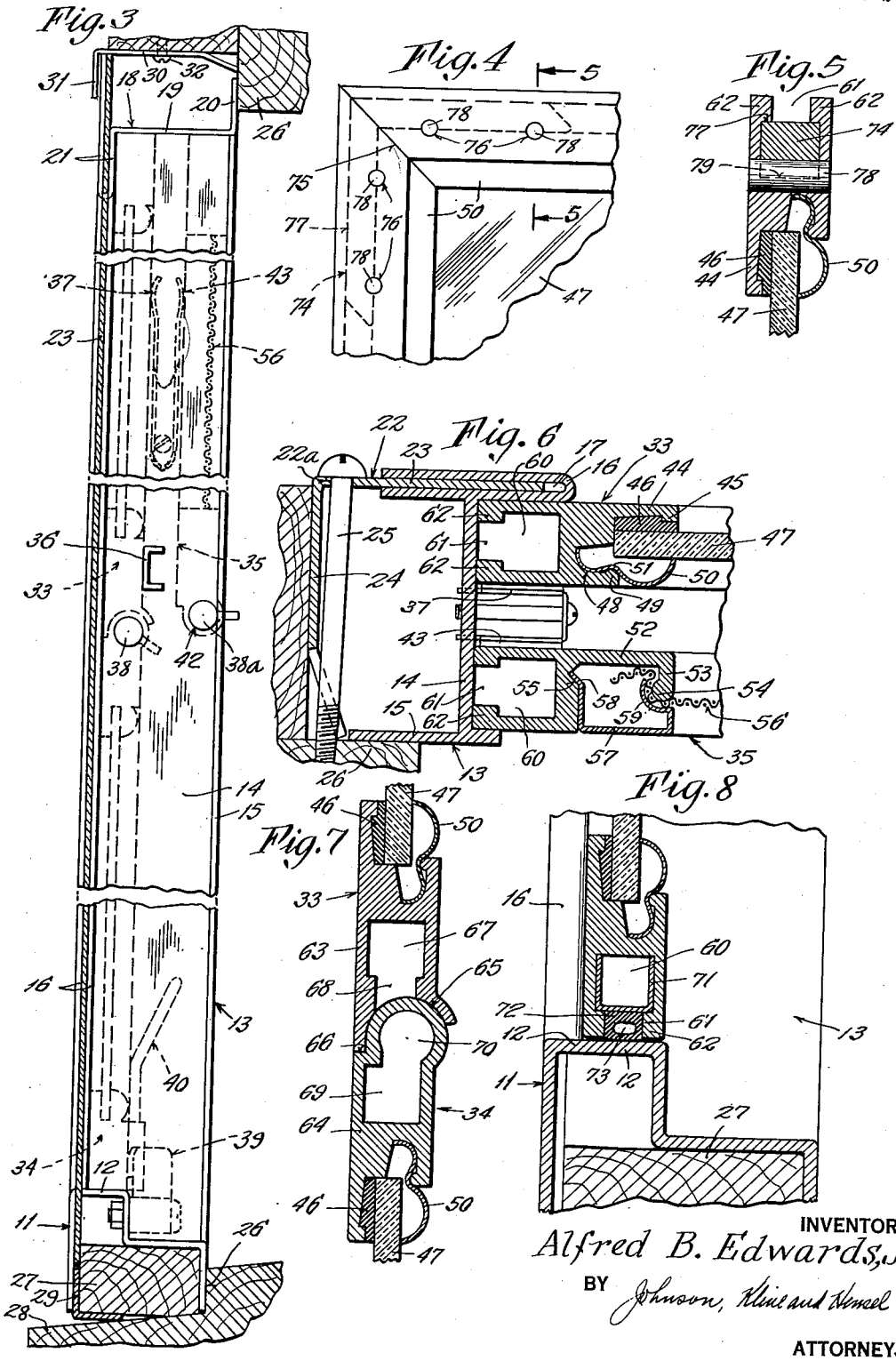

Patented Mar. 18, 1952

2,589,685

UNITED STATES PATENT OFFICE 2,589,685

WINDOW

Alfred B. Edwards, Jr., Plandome, N. Y.

Application April 2, 1946, Serial No. 659,080

11 Claims. (Cl. 189—75)

This invention relates to improvements in a window comprising a panel-receiving frame, removable panels, and means for mounting the frame in a building aperture, and is particularly applicable to a combination, storm or auxiliary window adapted for mounting in the outer portion of a permanent window.

It is the object of the invention to provide a frame assembly for a window of the aforesaid type, having simplified and conveniently installed means for mounting the frame in a building aperture, said means being adjustable to accommodate the assembly to variations or irregularity in the size of the building aperture so as to form a weather-tight junction with the building.

It is a further object to provide a frame structure and panel frames of compact construction, occupying only a small portion of the depth of the building aperture, and at the same time providing storage space for a third panel interchangeable with a panel in use.

Other objects are to provide improved means for securing glass and screening in the panel frames, and improved corner construction for securing the panel frame members together to form a rigid frame.

The improvements whereby the foregoing objects are accomplished lie in structural features of the frame, mounting means therefor, and panels to be mounted therein. Thus, in accordance with the invention the panel receiving frame is of rigid (preferably metal) construction, its base being adapted to rest on the sill of a building aperture. Means for mounting the frame in the aperture includes a pair of mounting members adapted to be fastened to the building at the sides of the aperture therein, said members slidably engaging the sides of the frame as by a tongue-and-grove engagement, whereby the mounting members hold the frame in the window aperture, but at the same time are capable of sidewise, vertical and tilting movement relative to the frame in the plane of the window, so that the mounting means can be adjusted to lie against the sides of the building aperture, thus accommodating the storm window to minor variations in the shape or size of the aperture, while at the same time maintaining weather-tight engagement with the edges of the frame. The top of the frame which is rigidly attached to the sides thereof, is not secured to the building, the space between the top of the frame and of the building aperture being protected by an independent member secured to the building at the top of the aperture and overhanging the top of the frame.

Panel frames, in accordance with the invention, are of hollow construction, preferably of light metal such as aluminum, whereby their weight is reduced to a minimum. The special form of the hollow frame members I employ includes grooves and passages for convenient insertion of sealing means for cooperation with the edges of the frame, and in addition permitting the panel members to be rigidly and conveniently secured together at the corners. The panel frames also include improved means for supporting and holding glass and screening, as well as for receiving sealing members providing a weather-tight connection between the panel frame and a pane of glass mounted therein.

The foregoing objects of the invention are attained in the structure illustrated by the preferred embodiment of the invention hereinafter described, in connection with the accompanying drawings, wherein:

Figure 1 is a front elevation of the storm window fully assembled, viewed from the inside.

Fig. 2 is an end view of the storm window shown in Fig. 1 installed in a window aperture of a building on the permanent window casing (shown in section) the side portion of the frame and the mounting being removed to show the underlying structure.

Fig. 3 is an enlarged vertical section along the line 3—3 of Fig. 1.

Fig. 4 is a detail of the corner of a panel frame.

Fig. 5 is a transverse vertical section along the line 5—5 in Fig. 4.

Fig. 6 is a transverse horizontal section along the line 6—6 in Fig. 1.

Fig. 7 is a transverse vertical section along the line 7—7 in Fig. 1.

Fig. 8 is a transverse vertical section along the line 8—8 in Fig. 1.

The present invention is illustrated as applied to a combination or storm window which comprises a frame 10 having a channel-shaped bottom member 11, open at its base, with a raised ledge 12 for engaging the lower edge of a panel to be mounted in the frame. The frame comprises a pair of side members 13 of I-shaped cross-section, as shown in Fig. 6, having a web 14, an inner flange 15 and an outer flange 16, the inner portion of the latter being folded over as shown to form a groove 17 running the full length of the side member, opening toward the side of the frame. The top member 18 of the frame comprises a horizontal web 19, a vertical flange 20 extending outward therefrom on the inner side of the frame to engage an abutment or ledge 26 on the permanent window casing, against which the frame 10 is secured, and an outer flange 21, similar in shape to the flange 16 of side members 13, the two side members and the top and bottom members of the frame 10 being rigidly secured together at the corners thereof to form a rigid rectangular structure.

Means for securing the frame 10 in a building aperture comprises, in accordance with the invention, a pair of angle members 22 in each of which one flange 23 engages groove 17 in flange 16 of the side members, the other flange 24 of said angle member lying against the lateral surface of the building aperture, for example, the side surface of the window casing. Engagement of flange 23 with groove 17 permits sliding movement of the mounting members 22 relative to the side members 13 of the frame, so that the mounting members can slide vertically or laterally, or tilt in the plane of the window permitting adjustment of the assembly to accommodate variations in width or angularity of the building aperture in which the storm window is to be mounted. Mounting members 22 are secured to the window frame preferably by means of fasteners, such as screws 25 extending through apertures 22a in the outside surface of flange 23 adjacent its junction with flange 24, and screwed into the supporting ledge 26 of the permanent window casing. The inner end of flange 24 is preferably bent inward, as shown in Fig. 6, so that it bears against the ledge 26 along a line at or beyond the center line of screws 25. By virtue of the latter arrangement, when the screws are tightened, they tend to urge the flange 24 outward against the side surfaces of the permanent window casing by causing the angle member 22 to pivot around the point of contact of flange 24 with the surface 26 of the window frame.

The bottom member 11 of the frame is advantageously provided with a filler piece 27, for example, of wood. The wooden filler piece 27 may be protected from the weather, for example by means of a metal angle piece 29 positioned against its outer lower corner, between the filler piece and the outer flange of the bottom frame member 11.

The frame thus is held in position by mounting members 22 so that the top of the frame requires no positive means for fastening it to the top of the building aperture. Any space which may remain between the top of the frame 10 and the top of the building aperture is protected against the weather by means of an independent angle member 30, having one flange fastened to the inner surface of the permanent window casing, and its other flange 31 overhanging the flange 21 of the top member 18 of the frame. For example, the angle member 30 can be secured in position by screws 32 threaded into the top of the permanent window casing.

Minor differences between the height of the frame and the height of the building aperture are thus provided for by the adjustment of the frame with respect to the overhanging flange 31 of the angle member 30 and also by the vertical movement of the protecting metal angle 30, with its accompanying backup or filler block 27. Where a substantial difference exists, the angle may be provided with a longer overhanging member 31, or the bottom angle 29 with a higher upstanding leg. The outside face of same would be partially exposed below the frame member 11.

In installing the frame in a window, the angle member 30, is first secured in position at the top of the building aperture. The filler block 27, and its protecting angle member 29 are placed inside the channel-shaped bottom member 11 of the frame 10 and mounting members 22 are inserted in grooves 17. The upper end of the frame is then inserted under the flange of angle member 30, and the lower portion of the frame together with the mounting members is swung inward until the inner portions thereof are seated against the inner ledge 26 of the permanent window casing, with filler block 27 resting on the sill 28. The mounting members 22 are forced outward against the side edges of the window casing, and screws 25 are inserted through the apertures provided therefor in the mounting members, and screwed into ledge 26 to hold the frame in place.

It will be observed that while this construction provides means for fastening the frame 10 in the window and accommodating the sides thereof to variations in width or angularity of the building aperture, mounting members are required only at the sides of the window. The bottom member 11 of the frame 10 rests freely upon the window sill, and requires no separate means for fastening it to the building. The top of the frame likewise requires no fastening, the space between the top of the window casing and the frame 10 being protected by the independent overhanging angle member 30 secured to the building. The frame 10 is preferably constructed to receive an upper panel 33 and lower panel 34 in edge-abutting relation, and includes space for storing a screen panel 35, interchangeable with the lower panel 34, in the upper part of the frame inside of the upper panel 33, as described in my copending application, Serial No. 659,079, filed April 2, 1946, now Patent No. 2,509,678. Thus, the upper panel 33 is mounted in the frame against the inner side of flange 21 of top member 18, and the inner side of flanges 16 on side members 13. It is held in position by fastening means such as a throw-bolt 36 engaging an aperture in the web 14 of a side member 13, the upper portion of the panel being urged outward against supporting flanges of the frame 10 by means of springs 37, likewise mounted on the web 14 of the side members 13. The lower panel 34 is mounted in edge-abutting relation with the upper panel 33 and likewise rests against the inner surface of flanges 16 on the side members 13, while its lower edge rests on the raised ledge 12 of bottom member 11. A portion of the inside flanges 15 of side member 13 is cut away below the point 37 to permit insertion of the panels in the frame from the inside thereof. Means for securing the lower panel 34 in the frame includes a pair of pintles 38 mounted in the top rail of the frame of the lower panel 34 for projection into corresponding apertures in the webs 14 of the side members 13 of the frame. Panel 34 is adapted to swing inward about said pintles as an axis for ventilation. A pair of keepers 39 mounted on the inner surface of the lower member 11 of the frame are provided for holding the panel closed; while latch means comprising a latch member 40 mounted on the panel 34 at its lower edge, and a latch bar 41 mounted on the lower member 11 of the frame are provided for holding the window open for ventilation as more fully described in my aforesaid copending application.

The screen panel 35 is shaped like the panel 34, so as to be interchangeable therewith, and includes a pintle 38a for securing said panel in the frame in the same manner as the lower panel. To provide for storage of panels 35 (or 34) a pair of apertures 42 are formed in the webs 14 of the side members 13, adjacent the inner flanges 15 for receiving pintle 38a, to hold the screen panel 35 in inverted position in the upper part of the frame 10 facing the inside of upper panel 33. A pair of springs 43 similar to springs 37 on the side members 13 of the frame urge the screen panel against the inside of flanges 15 when stored, as shown in the drawings.

In accordance with my invention, the panel frames are preferably constructed of extruded hollow metal pieces, having a cross-section as illustrated in Figs. 5, 6, 7 and 8, having specially formed flanges and grooves on their inner edges for receiving and sealing glass therein and for fastening screening as the case may be. For holding a pane of glass in the panels, the latter are provided with a supporting flange 44 having a ledge 45 on its inner surface. A sealing strip 46 of rubber or similar composition is positioned against the flange 44 and held against lateral movement by engagement with the ledge 45 at the edge of the flange. A pane of glass 47 is positioned against the sealing strip, and means are provided for holding the glass resiliently against the same. By employing sealing strips of different thickness, the frame can be used with glass of single or double thickness. Means for holding the pane of glass against the sealing strip preferably comprises a groove 48 along the inner edge of the frame at the base of flange 44, terminating at a lip 49 protruding inward toward flange 44. A spline 50 of resilient metal has one side thereof shaped to lie within the groove 48 and is provided with a central depression 51 which engages the lip 49 at the edge of the groove. The opposite side of the spline is shaped to press resiliently against the surface of the glass pane 47 supported against sealing strip 46. The spline 50 can be readily slipped into the groove 48 after positioning the pane 47 in the panel frame against the sealing strip 46, the engagement of central depression 51 with lip 49 holding the spline 50 in position.

The screen panel 35 is provided with means for conveniently securing screening therein, comprising an inwardly extending L-shaped flange 52 having its inwardly turned portion 53 terminating in a bead 54. A groove 55 is formed on the inner surface of the panel frame, at the base of flange 52. Means for securing a piece of screening 56 in the panel comprises a spline 57 having an outwardly bent flange 58 for engaging the groove 55; and having a cylindrical flange 59 at its opposite edge for clamping the screening 56 against and around the bead 54. The cylindrical flange 59 and screening 56 engage the bead 54 in the nature of a detent, so that the screening is resiliently held in frictional engagement with the bead and is thus held taut across the opening in the panel. For installing a piece of screening in the panel frame it is placed with its edges overlying the bead 54, the edge is rolled into the recessed portion 53 with a rolling tool and the spline 57 is inserted by causing the cylindrical portion 59 of same to bear against the screen and bead 54, and the flange 58 is then sprung into its engaging groove 55, thereby locking the screen cloth in position.

The outer portions of the panel frame of panels 33, 34, and 35 are preferably of hollow construction so as to reduce their weight to a minimum, the portions of panel frames engaging the frame 10, i. e. the lower and side rails of lower panels 34 and 35 and the top and side rails of upper panel 33 have the shape shown in Figs. 5, 6 and 8. Thus, the outer portions of these rails comprise a substantially rectangular inner passage 60 and a narrower passage 61 communicating therewith, and open at the edge of the frame. The passage thus forms a groove similar in shape to a keyway, the thickened edges 62 of the groove tending to strengthen the frame and rendering it rigid despite its light construction.

The lower rail 63 of the upper panel 33 and the top rail 64 of the lower panels have the shapes shown in Fig. 7, the contiguous surfaces of said rails including a cylindrical portion 65, concave on the lower rail 63 of the upper panel and convex on the top rail 64 of the lower panel. The cylindrical surface 65 terminates at a horizontal abutment 66 on the outer side of the panels so that the lower panel can be mounted for pivotal movement about the axis of said cylindrical surface to swing inward from the frame 10 when it is desired to open the window for ventilation.

The lower rail 63 of the upper panel has a rectangular passage 67 similar to the passages 60 in the side rails, and a narrower groove 68 communicating with said passage, opening along the concave cylindrical surface 65 of the rail. The upper rail 64 of the lower panel includes a rectangular passage 69, similar to passages 60 and 67, and a tubular bore 70 communicating with said rectangular passage, and concentric with the convex cylindrical surface 65 of the rail. The bore 70 houses the pintles 38 for pivotal suspension of the lower panel in the frame 10. The upper rail of panel 35 is similar in construction to the top rail 64 of lower panel 34. The panel frame members can be conveniently formed by extrusion of metal such as aluminum.

The groove formed by passages 60 and 61 in the bottom rail of lower panel 34 may be advantageously adapted to receive a sealing strip by insertion of a channel-shaped member 71 in passage 60 as a backing. A sealing strip 72 of rubber or similar resilient material having a central bore 73, is inserted in the passage or groove 61 against the channel member 71. The sealing strip is preferably slightly oversized so that it will be deformed when inserted in the groove 61 and will bulge out, thereby resiliently engaging ledge 12 on the lower member of frame 10 to form a tight seal therewith. If required, a similar seal may be provided for the other frame engaging edges.

Rectangular passages 60, 67 and 69 can be advantageously employed in a novel corner construction for the panel frames, illustrated in Figs. 4 and 5. For this purpose, a corner member 74 is constructed to have a rectangular cross-section corresponding to the cross-section of passages 60, 67 and 69, and comprises two arms forming a right angle as shown in Fig. 4. The ends of the panel frame members are mitred, forming a junction along the diagonal line 75, the rectangular passages therein coinciding at the junction. The arms of the corner member 74 are inserted in rectangular passages 60 (or 67 or 69) and the panel frame members are brought together with their mitred edges in contact. A number of holes 76 are drilled through the panel frame and corner member 74, and according to the invention are centered along the plane of the inner surface 77 of the arms of corner member 74. Dowel pins 78 are then forced into said holes, locking the panel frame members to the corner piece 74.

The location of the dowel pins 78 with their centers coinciding with a surface, preferably the inner surface, of the corner member 74, results in a number of advantages. Thus, the dowel pins force the corner member outward against the opposite side of passages 60 (or 67 or 69), enhancing the rigidity of the panel frame.

Moreover, as compared with a dowel pin passing through the body of the corner member 74, the shearing force applied to the dowel pin in the construction herein described, is distributed over an area corresponding to an axial plane of the dowel pin extending the full depth of the corner member 74, plus two semi-circular transverse cross-sectional areas of the pin, thus providing a considerably larger area to support the shearing force than a pair of transverse circular cross-sectional areas which would sustain the shear if the dowel pin passed through the body of the corner member. The extent of the planes supporting the shearing force is indicated by the dotted line 79 in Fig. 5.

Furthermore the width of the corner member 74 is reduced only by half the diameter of the dowel pins rather than by a full diameter thereof, as would be the case if the dowel pin passed through the body of the corner member. The present construction thus minimizes the weakening effect of the holes 76 on the corner member making possible the use of a corner member of smaller size and lighter weight to attain the desired strength.

Variations and modifications may be made within the scope of this invention and portions of the improvements may be used without others.

I claim:

1. In a window for mounting in a building aperture having abutments therein, a rigid panel-receiving frame, said abutments projecting inwardly from the edge of said aperture and having a panel-engaging face; a pair of vertical mounting members extending the full length of the frame at each side thereof, and having sliding engagement with the frame to permit sidewise and tilting movement of said members relative to the frame in the plane thereof; means securing said mounting members against the sides of a building aperture to close the same and clamp said frame against an abutment to retain said frame in the aperture; and means separate from the mounting means secured to the top of the building aperture and projecting therefrom to overhang the top of the frame and close the same.

2. In a window for mounting in a building aperture having abutments therein, a rigid panel-receiving frame, a closure for the base of said frame adapted to rest on the sill of a building aperture; a pair of vertical mounting members extending the full length of the frame at each side thereof and having sliding engagement with the frame to permit sidewise and tilting movement relative to the frame in the plane thereof; means accessible from the outside of the frame when the frame is in position securing said mounting members against the sides of the building aperture to close the same and clamp said frame against an abutment to retain said frame in the aperture; and means separate from the mounting means secured to the top of the building aperture and projecting therefrom to overhang the top of the frame and close the same.

3. In a window for mounting in a building aperture having abutments therein, a rigid panel-receiving frame, said abutments projecting inwardly from the edge of said aperture and having a panel-engaging face; a base for closing said frame being shaped to rest on the sill of a building aperture, a pair of vertical mounting members extending the full length of the frame at each side thereof, said members having a tongue-and-groove engagement with the side members of the frame so as to permit sidewise and tilting movement of the members relative to the frame in the plane thereof, and having surface portions for engaging the sides of the building aperture; means securing the mounting members in the opening to clamp the frame against an abutment; and means separate from the mounting means secured to the top of the building aperture and projecting therefrom to overhang the top of the frame and close the same.

4. In a window for mounting in a building aperture having abutments therein, a rigid panel-receiving frame, the sides of said frame each having an exterior groove; a pair of angle members extending the full length of the sides of the frame, each having one flange extending slidably into one of said grooves so as to permit sidewise and tilting movement of said angle member relative to the frame in the plane thereof, and the other flange of said angle member extending inward from the first-named flange so as to lie against a side of the building aperture; and means extending from the exterior of said frame for fastening said angle members to the building with the latter flanges engaging the sides of the building aperture and the first-named flange clamping the frame against an abutment to retain the frame therein.

5. In a window for mounting in a building aperture, a panel-receiving frame, the sides of said frame having an exterior groove; a pair of angle members extending the full length of the sides of the frame, each having one flange extending slidably into one of said grooves so as to permit sidewise and tilting movement of said angle member relative to the frame in the plane thereof, and the other flange of said angle member extending inward from the first-named flange so as to lie against a side of the building aperture with its edge abutting a ledge in said aperture; and means for fastening said angle members at the sides of the aperture comprising screws entering the groove-engaging flange, and threaded into said ledge in the building aperture, to clamp the frame thereagainst and retain the frame in the aperture.

6. In a storm window for mounting in a building aperture a panel-receiving frame, the sides of said frame having an exterior groove; a pair of angle members extending the full length of the sides of the frame, each having one flange extending slidably into one of said grooves so as to permit sidewise and tilting movement of said angle member relative to the frame in the plane thereof, and the other flange of said angle member extending inward from the first named flange so as to lie against a side of the building aperture, the edge portions of the second flange being bent inwardly so as to abut a ledge in said building aperture along a line spaced from the sides of the aperture; and means for fastening said angle members at the sides of the aperture comprising screws entering the groove-engaging flange of said mounting member and threaded into the ledge in said building aperture between the side of the building aperture and the line of contact of said inwardly bent edge portions of the second flange of said angle members with said ledge in the building aperture.

7. In a storm window for mounting in a building aperture, a panel-receiving frame having a hollow base member open on its under surface; a filler block inserted in said hollow member; a cover strip for the lower outer corner of said wood block extending within the hollow portion of the base of said frame; the sides of said frame having an exterior groove opening at the outer edge thereof; a pair of angle members extending the full length of the sides of the frame, each having one flange extending slidably into one of said grooves, so as to permit sidewise and tilting movement of said angle member relative to the frame in the plane thereof, and the other flange of said angle member extending inward from the first-named flange so as to lie against the side of the building aperture; means accessible from the outer side of the frame for fastening said angle members to the building with the latter flanges engaging the sides of the building aperture to retain the frame therein; and an independent angle member having one flange attachable to the top of the building aperture and the other flange overhanging and closing the top of the frame.

8. In an auxiliary window for mounting in a building aperture, a rigid frame, each of the side members of the frame having a web portion perpendicular to the plane of the frame, and an outer flange extending inward in the plane of the frame from the outer edge of said web portion so as to form an abutment for supporting panels in the frame; a groove in each of said flanges opening along the outer edge of the frame; and a pair of angle members extending the full length of the sides of the frame each having one flange extending slidably into one of said grooves so as to permit sidewise and tilting movement of said angle members relative to the frame in the plane thereof, and the other flange of said angle member extending inward so as to lie against the side of a building aperture; and means for fastening said angle members to the building with the latter flanges engaging the sides of the building aperture to retain the frame therein, the base having a raised ledge thereon for engaging the lower edge of a panel positioned against the abutment-forming flanges at the outer edges of the side members of the frame.

9. In an auxiliary window for mounting in a building aperture, the combination of the structure defined in claim 8 with a panel having a groove along its edge and a sealing strip of resilient composition inserted within said groove, said sealing strip being hollow and oversized so as to bulge outward from the groove and forming a sealing edge for contact with the ledge on the cooperating member of the frame.

10. In a storm window for mounting in a building aperture, a rigid metal frame, each of the side members of the frame having a web portion perpendicular to the plane of the frame and an inner and outer flange extending outwardly from the edges of the web portion in the plane of the frame, the outer flange having an extension extending inwardly of the web to form an abutment for supporting panels within the frame and folded back upon itself to form a groove opening along the outer edge of the frame; a pair of angle members extending the full length of the sides of the frame, each having one flange extending slidably into one of said grooves so as to permit sidewise and tilting movement of said angle member relative to the frame in the plane thereof, and the other flange of said angle member extending inward from the first-named flange so as to lie against a side of the building aperture with its edge abutting a ledge in said aperture; and means for fastening said angle members at the sides of the apertures comprising screws entering the groove-engaging flange and threaded into said ledge in the building aperture to clamp the inner flange against the ledge and retain the frame therein.

11. In a storm window for mounting in a building aperture, a rigid metal frame, each of the side members of the frame having a web portion perpendicular to the plane of the frame and an inner and outer flange extending outwardly from the edges of the web portion in the plane of the frame, the outer flange having an extension extending inwardly of the web to form an abutment for supporting panels within the frame and folded back upon itself to form a groove opening along the outer edge of the frame and the inner flange having an inward extension along that portion thereof between the top of the frame and a point above the middle of the frame to form an abutment for supporting a second panel; a pair of angle members extending the full length of the sides of the frame, each having one flange extending slidably into one of said grooves so as to permit sidewise and tilting movement of said angle members relative to the frame in the plane thereof, and the other flange of said angle member extending inward from the first-named flange so as to lie against a side of the building aperture with its edge abutting a ledge in said aperture; and means for fastening said angle members at the sides of the apertures comprising screws entering the groove-engaging flange and threaded into said ledge in the building aperture to clamp the inner flange against the ledge and retain the frame therein.

ALFRED B. EDWARDS, Jr.

REFERENCES CITED

The following references are of record in the file of this patent:

UNITED STATES PATENTS

| Number | Name | Date |
|---|---|---|
| 1,111,323 | Richards et al. | Sept. 22, 1914 |
| 1,111,621 | Singer | Sept. 22, 1914 |
| 1,683,421 | Sodergren | Sept. 4, 1928 |
| 1,763,489 | Turner | June 10, 1930 |
| 1,887,740 | Thurwanger | Nov. 15, 1932 |
| 2,156,964 | Biddle | May 2, 1939 |
| 2,262,670 | Ensminger | Nov. 11, 1941 |
| 2,291,726 | Kaufmann | Aug. 4, 1942 |
| 2,292,273 | Kaufmann | Aug. 4, 1942 |
| 2,419,425 | Sylvan | Apr. 22, 1947 |
| 2,430,772 | Kammerer | Nov. 11, 1947 |